UNITED STATES PATENT OFFICE.

DAVID AHL, OF NEWVILLE, PENNSYLVANIA.

IMPROVED COMPOSITION FOR COATING OIL-BARRELS.

Specification forming part of Letters Patent No. 45,379, dated December 6, 1864.

*To all whom it may concern:*

Be it known that I, DAVID AHL, of Newville, Cumberland county, State of Pennsylvania, have invented a new and useful Compound for Coating the Inside of Barrels or other Vessels; and I do hereby declare that the following is an exact description thereof.

The nature of my invention consists in the composition of gum-shellac and alcohol, or gum-shellac and borate of soda or pearlash, as a solvent, for the purpose of saturating or coating barrels or other vessels to prevent their leakage.

To enable others skilled in the art to make and use my invention, I will proceed to describe the mode of mixing the ingredients, as follows:

I mix the ingredients to form my composition in the following quantities and proportions: I use of rosin, fifty pounds, and of gum-shellac, fifty pounds, with a sufficient quantity of alcohol to dissolve them; or, in lieu of the alcohol, I use twenty-five pounds of borate of soda or six pounds of pearlash, or any alkali of the requisite proportions.

I wish it to be understood that I do not confine myself to the proportions above mentioned, as they can be varied with pleasure.

I put the ingredients in a kettle and cover them with a sufficient quantity of water and made to boil. The articles are to be well mixed until they are perfectly dissolved. In this composition I first immerse the staves or other parts or materials that form barrels or vessels, for the purpose of perfectly saturating and filling up the pores of the wood. The wood, being heated by the composition, is dried, so as to expel its sap and render the wood not liable to shrinkage, and perfectly impervious to fluids, water, spirits, or oil; or, when the barrel or other vessel has been prepared or finished, I saturate it in my composition, the composition entering at the bung-hole and completely lining and coating the inside of the vessel. I use this composition either hot or cold, and I either saturate the staves and inside of the vessels or coat them with the composition by means of a brush; but I prefer using the composition hot, as the surface will dry quicker.

This composition is especially well adapted to prevent the leakage of coal-oil or petroleum barrels; but I also intend to use it for coating all other vessels. When using the alkali, and after the barrels are dried, I steep them in diluted acids for the purpose of neutralizing the effects of the alkali.

What I claim as my invention, and desire to secure by Letters Patent, is—

The composition as herein specified, for the purposes herein set forth.

DAVID AHL.

Witnesses:
 J. FRANKLIN REIGART,
 JOHN S. HOLLINGSHEAD.